(12) United States Patent
Choi

(10) Patent No.: US 12,077,133 B2
(45) Date of Patent: Sep. 3, 2024

(54) DEVICE AND METHOD FOR CONTROLLING A WIPER OF A VEHICLE

(71) Applicants: HYUNDAI MOTOR COMPANY, Seoul (KR); KIA CORPORATION, Seoul (KR)

(72) Inventor: Jae Ryong Choi, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 476 days.

(21) Appl. No.: 17/373,610

(22) Filed: Jul. 12, 2021

(65) Prior Publication Data

US 2022/0194321 A1 Jun. 23, 2022

(30) Foreign Application Priority Data

Dec. 17, 2020 (KR) .................. 10-2020-0177734

(51) Int. Cl.
*B60S 1/08* (2006.01)
*G01N 21/35* (2014.01)

(52) U.S. Cl.
CPC ............ *B60S 1/0859* (2013.01); *G01N 21/35* (2013.01)

(58) Field of Classification Search
CPC ............................... H02P 5/00; B60S 1/0859
USPC ......................................................... 318/483
See application file for complete search history.

(56) References Cited

U.S. PATENT DOCUMENTS

| 10,196,043 B2* | 2/2019 | Shoda ................. B60S 1/0833 |
| 2008/0157704 A1* | 7/2008 | Ishikawa ............... B60S 1/0818 |
| | | 318/483 |
| 2019/0061696 A1* | 2/2019 | Vadgaonkar .......... B60S 1/0807 |
| 2023/0311951 A1* | 10/2023 | Kobayashi ............ B60W 50/08 |
| | | 701/23 |

FOREIGN PATENT DOCUMENTS

| CN | 205524141 U | * | 8/2016 | |
| CN | 206884993 U | * | 1/2018 | |
| CN | 107783528 A | * | 3/2018 | ............. B60R 16/02 |
| JP | 2010202035 A | * | 9/2010 | |
| JP | 2020192916 A | * | 12/2020 | ............. F16B 13/124 |
| KR | 970069687 A | * | 11/1997 | |
| KR | 20100059008 A | * | 6/2010 | |
| KR | 20130053051 A | * | 5/2013 | |

* cited by examiner

*Primary Examiner* — Kawing Chan
(74) *Attorney, Agent, or Firm* — Lempia Summerfield Katz LLC

(57) ABSTRACT

A device, and a corresponding method, for controlling a wiper of a vehicle may include: a storage that stores a reference table, wherein each wiper operation mode corresponding to each rainfall and each sensitivity level is recorded in the reference table; a rain sensor that measures the rainfall; a wiper switch that receives a wiper operation mode and a sensitivity level input from a driver; and a controller that detects a wiper manipulation pattern of the driver based on the measured rainfall and that changes the reference table to a driver-customized-table based on the wiper manipulation pattern of the driver.

15 Claims, 5 Drawing Sheets

DEVICE AND METHOD FOR CONTROLLING A WIPER OF A VEHICLE

CROSS-REFERENCE TO RELATED APPLICATION

This application claims the benefit of priority to Korean Patent Application No. 10-2020-0177734, filed in the Korean Intellectual Property Office on Dec. 17, 2020, the entire contents of which are incorporated herein by reference.

TECHNICAL FIELD

The present disclosure relates to a technology for controlling an operation mode of a wiper based on a wiper manipulation pattern of a driver.

BACKGROUND

In general, a vehicle is equipped with a wiper that removes foreign substances located on a surface of a windshield glass and wipes snow or rain. Such a wiper of the vehicle is an apparatus that wipes the glass through a wiper blade that operates by rotation of a wiper motor and performs a function of securing or clearing a view of a driver. In other words, the wiper of the vehicle has a structure in which a rotational motion generated on the wiper motor is transmitted to a pivot mechanism and a wiper arm through a wiper link. Thus, the wiper blade moves on the surface of the glass to wipe the foreign substances on the surface of the glass as the wiper arm pivots in a reciprocating manner in a left and right direction. In this case, an operation of the wiper motor is controlled by a body control module (BCM) or an integrated body unit (IBU) equipped in the vehicle.

A recently released vehicle is equipped with a rain sensor and an electronic control wiper (ECW). Thus, in case of rain, not only the wiper may be automatically operated, but also a location of the wiper blade may be identified to perform subdivided location control.

Because a conventional technology of controlling the wiper of the vehicle controls an operation mode of the wiper based on a reference table common to all vehicles, there is a problem of causing dissatisfaction of the driver as propensity of the driver cannot be reflected.

For example, in an auto mode, a speed of the wiper is automatically adjusted based on a rainfall sensed by the rain sensor. Depending on the propensity of the driver, the driver may want the wiper to operate at a higher speed or at a lower speed, but the conventional technology does not reflect the propensity of the driver and control the operation mode of the wiper based on the reference table.

The matters described in this background are written to enhance an understanding of the background of the present disclosure and may include matters other than the prior art already known to those having ordinary skill in the field to which this technology belongs.

SUMMARY

The present disclosure has been made to solve the above-mentioned problems occurring in the prior art while advantages achieved by the prior art are maintained intact.

An aspect of the present disclosure provides a device and a method for controlling a wiper of a vehicle that may detect a wiper manipulation pattern of a driver based on a rainfall and control an operation mode of the wiper based on the wiper manipulation pattern of the driver. Thus, a wiper operation mode optimized for propensity of the driver may be provided.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, a device for controlling a wiper of a vehicle includes storage that stores a reference table, wherein each wiper operation mode corresponding to each rainfall and each sensitivity level is recorded in the reference table. The device also includes a rain sensor that measures the rainfall. The device also includes a wiper switch that receives a wiper operation mode and a sensitivity level input from a driver. The device also includes a controller that detects a wiper manipulation pattern of the driver based on the measured rainfall and changes the reference table to a driver-customized-table based on the wiper manipulation pattern of the driver.

In one implementation, the controller may identify propensity of the driver when the wiper operation mode is changed or the sensitivity level is changed.

In one implementation, the controller may identify the propensity of the driver a reference number of times and accumulate the identified propensity of the driver to detect the wiper manipulation pattern of the driver.

In one implementation, the controller may allocate a score to each of the operation modes of the wiper and the sensitivity levels and may identify propensity C of the driver based on a following [Equation 1].

In one implementation, the controller may change the reference table to a driver-customized-table having an operation period or an operation speed of the wiper shorter or higher than an operation period or an operation speed of the wiper of the reference table when an average value of the identified propensity C of the driver is positive.

In one implementation, the controller may update the driver-customized-table using an average value of some of the identified propensity C of the driver and propensity C of the driver identified later.

In one implementation, the controller may change the reference table to a driver-customized-table having an operation period or an operation speed of the wiper longer or lower than an operation period or an operation speed of the wiper of the reference table when an average value of the identified propensity C of the driver is negative.

In one implementation, the controller may update the driver-customized-table using an average value of some of the identified propensity C of the driver and propensity C of the driver identified later.

In one implementation, the wiper operation mode may include an Auto_Int_slow mode, an Auto_Int_fast mode, an Auto_Low mode, an Auto_High mode, an Auto_Power mode, a Low mode, and a High mode.

In one implementation, the controller may reduce a wiping angle to be smaller than wiping angles in other modes when the wiper is operated in the Auto_Power mode.

According to another aspect of the present disclosure, a method for controlling a wiper of a vehicle includes storing, by storage, a reference table, wherein each wiper operation mode corresponding to each rainfall and each sensitivity level is recorded in the reference table. The method also includes measuring, by a rain sensor, the rainfall. The method also includes receiving, by a wiper switch, a wiper operation mode and a sensitivity level input from a driver.

The method also includes detecting, by a controller, a wiper manipulation pattern of the driver based on the measured rainfall. The method also includes changing, by the controller, the reference table to a driver-customized-table based on the wiper manipulation pattern of the driver.

In one implementation, the detecting of the wiper manipulation pattern of the driver may include: identifying propensity of the driver when the wiper operation mode is changed or the sensitivity level is changed; identifying the propensity of the driver a reference number of times; and accumulating the identified propensity of the driver to detect the wiper manipulation pattern of the driver.

In one implementation, the identifying of the propensity of the driver may include allocating a score to each of the operation modes of the wiper and the sensitivity levels and identifying propensity C of the driver based on a following [Equation 1].

In one implementation, the changing of the reference table to the driver-customized-table may include changing the reference table to a driver-customized-table having an operation period or an operation speed of the wiper shorter or higher than an operation period or an operation speed of the wiper of the reference table when an average value of the identified propensity C of the driver is positive. The changing of the reference table to the driver-customized-table may also include changing the reference table to a driver-customized-table having an operation period or an operation speed of the wiper longer or lower than the operation period or the operation speed of the wiper of the reference table when the average value of the identified propensity C of the driver is negative.

In one implementation, the method may further include updating the driver-customized-table using an average value of some of the identified propensity C of the driver and propensity C of the driver identified later.

In one implementation, the method may further include reducing a wiping angle to be smaller than wiping angles in other modes when the wiper is operated in the Auto_Power mode.

According to another aspect of the present disclosure, a device for controlling a wiper of a vehicle includes the wiper disposed on the vehicle. The device also includes a rain sensor that measures a rainfall. The device also includes a wiper switch that receives an operation mode of the wiper and a sensitivity level of the rain sensor. The device also includes a controller that detects a wiper manipulation pattern of a driver based on the measured rainfall and controls the operation mode of the wiper based on the wiper manipulation pattern of the driver.

In one implementation, the controller may allocate a score to each operation mode of the wiper and each sensitivity level and identify propensity C of the driver based on a following [Equation 1] when the operation mode of the wiper is changed or the sensitivity level is changed.

In one implementation, the controller may change the reference table to a driver-customized-table having an operation period or an operation speed of the wiper shorter or higher than an operation period or an operation speed of the wiper of the reference table when an average value of the identified propensity C of the driver is positive. The controller may also change the reference table to a driver-customized-table having an operation period or an operation speed of the wiper longer or lower than the operation period or the operation speed of the wiper of the reference table when the average value of the identified propensity C of the driver is negative.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
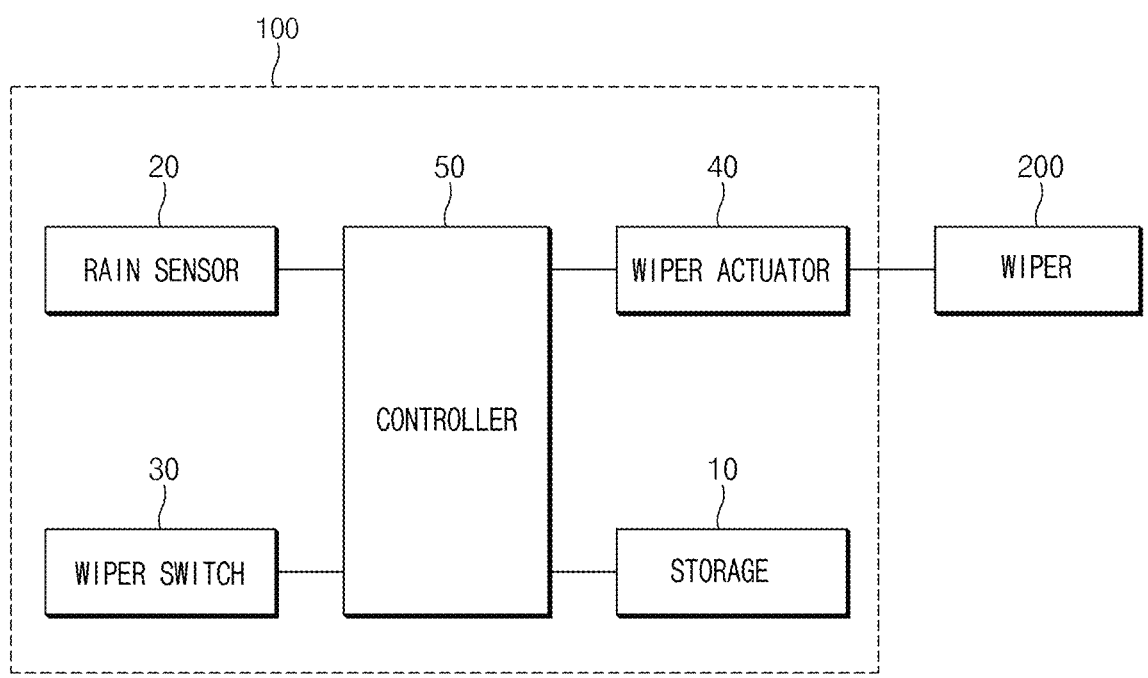
FIG. 1 is a block diagram of a device for controlling a wiper of a vehicle according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function has been omitted when it is determined that it interferes with the understanding of the embodiment of the present disclosure.

In describing the components of the embodiments according to the present disclosure, terms such as first, second, A, B, (a), (b), and the like may be used. These terms are merely intended to distinguish the components from other components and the terms do not limit the nature, order, or sequence of the components. Unless otherwise defined, all terms including technical and scientific terms used herein have the same meaning as commonly understood by those having ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function.

FIG. 1 is a block diagram of a device for controlling a wiper of a vehicle according to an embodiment of the present disclosure.

As shown in FIG. 1, a device 100 for controlling a wiper of a vehicle according to an embodiment of the present disclosure may include storage 10, a rain sensor 20, a wiper switch 30, a wiper actuator 40, and a controller 50. In this case, depending on a scheme for implementing the device 100 for controlling the wiper of the vehicle, components may be coupled to each other to be implemented as one component, or some components may be omitted.

Each of the components is described. First, the storage 10 may store various logics, algorithms, and programs required in a process of detecting a wiper manipulation pattern of a driver based on a rainfall and controlling an operation mode of the wiper based on the wiper manipulation pattern of the driver.

The storage 10 may store a reference table in which each operation mode corresponding to each rainfall section and each sensitivity of the rain sensor 20 is recorded. In this case, the reference table is as shown in Table 1 below as an example.

TABLE 1

| Tenth section | Auto_High | Auto_High | Auto_High | Auto_Power | Auto_Power |
|---|---|---|---|---|---|
| Ninth section | Auto_High | Auto_High | Auto_High | Auto_High | Auto_Power |
| Eighth section | Auto_Low | Auto_Low | Auto_High | Auto_High | Auto_High |
| Seventh section | Auto_Low | Auto_Low | Auto_Low | Auto_High | Auto_High |
| Sixth section | Auto_Int_fast | Auto_Low | Auto_Low | Auto_Low | Auto_High |
| Fifth section | Auto_Int_fast | Auto_Int_fast | Auto_Int_fast | Auto_Low | Auto_Low |
| Fourth section | Auto_Int_slow | Auto_Int_fast | Auto_Int_fast | Auto_Int_fast | Auto_Low |
| Third section | Auto_Int_slow | Auto_Int_slow | Auto_Int_slow | Auto_Int_ fast | Auto_Int fast |
| Second section | OFF | OFF | Auto_Int_slow | Auto_Int_slow | Auto_Int_fast |
| First section | OFF | OFF | OFF | Auto_Int_slow | Auto_Int_slow |
| Rainfall section Sensitivity | Sensitivity 1 | Sensitivity 2 | Sensitivity 3 | Sensitivity 4 | Sensitivity 5 |

In the [Table 1], the rainfall sections are 10 divided sections between a minimum rainfall and a maximum rainfall. As an example, a tenth section may correspond to a case of heavy rain and a first section may correspond to a case of drizzle. In addition, a sensitivity level refers to a value set by the driver through the wiper switch 30. In this case, when the sensitivity level is set to 1, an operation period of the wiper 200 is lengthened. In addition, when the sensitivity level is set to 5, the operation period of the wiper 200 is shortened. As an example, when the wiper 200 operates 5 times every 10 seconds in the case in which the sensitivity level is 1, the wiper 200 may operate 10 times every 10 seconds in the case in which the sensitivity level is 5.

The storage 10 may further store a reference table updated by the controller 50 (a driver-customized-table). In this case, the driver-customized-table refers to a table in which the operation mode in the previous reference table is changed based on the wiper manipulation pattern of the driver. In this case, the driver-customized-table is as shown in [Table 2] and [Table 3] below as an example.

TABLE 2

| Tenth section | Auto_High | Auto_High | Auto_Power | Auto_Power | Auto_Power |
|---|---|---|---|---|---|
| Ninth section | Auto_High | Auto_High | Auto_High | Auto_Power | Auto_Power |
| Eighth section | Auto_High | Auto_High | Auto_High | Auto_High | Auto_Power |
| Seventh section | Auto_Low | Auto_Low | Auto_High | Auto_High | Auto_High |
| Sixth section | Auto_Low | Auto_Low | Auto_Low | Auto_High | Auto_High |
| Fifth section | Auto_Int_fast | Auto_Low | Auto_Low | Auto_Low | Auto_High |
| Fourth section | Auto_Int_fast | Auto_Int_fast | Auto_Int_fast | Auto_Low | Auto_Low |
| Third section | Auto_Int_slow | Auto_Int_fast | Auto_Int_fast | Auto_Int_fast | Auto_Low |
| Second section | Auto_Int_slow | Auto_Int_slow | Auto_Int_slow | Auto_Int fast | Auto_Int_fast |
| First section | OFF | OFF | Auto_Int_slow | Auto_Int_slow | Auto_Int_fast |
| Rainfall section Sensitivity | Sensitivity 1 | Sensitivity 2 | Sensitivity 3 | Sensitivity 4 | Sensitivity 5 |

The [Table 2] shows a table applied when propensity of the driver is a type that desires an operation period or an operation speed of the wiper shorter or higher than that of the reference table.

TABLE 3

| | | | | | |
|---|---|---|---|---|---|
| Tenth section | Auto_High | Auto_High | Auto_High | Auto_High | Auto_Power |
| Ninth section | Auto_Low | Auto_Low | Auto_High | Auto_High | Auto_High |
| Eighth section | Auto_Low | Auto_Low | Auto_Low | Auto_High | Auto_High |
| Seventh section | Auto_Int_fast | Auto_Low | Auto_Low | Auto_Low | Auto_High |
| Sixth section | Auto_Int_fast | Auto_Int_fast | Auto_Int_fast | Auto_Low | Auto_Low |
| Fifth section | Auto_Int_slow | Auto_Int_fast | Auto_Int_fast | Auto_Int_fast | Auto_Low |
| Fourth section | Auto_Int_slow | Auto_Int_slow | Auto_Int_slow | Auto_Int_fast | Auto_Int_fast |
| Third section | OFF | OFF | Auto_Int_slow | Auto_Int_slow | Auto_Int_fast |
| Second section | OFF | OFF | OFF | Auto_Int_slow | Auto_Int_slow |
| First section | OFF | OFF | OFF | OFF | OFF |
| Rainfall section Sensitivity | Sensitivity 1 | Sensitivity 2 | Sensitivity 3 | Sensitivity 4 | Sensitivity 5 |

The [Table 3] shows a table applied when the propensity of the driver is a type that desires an operation period or an operation speed of the wiper longer or lower than that of the reference table.

The storage 10 may include at least one type of recording media (storage media) of a memory of a flash memory type, a hard disk type, a micro type, a card type (e.g., a secure digital card (SD card) or an eXtream digital card (XD card)), and the like, and/or a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The rain sensor 20 is a sensor that is mounted on a windshield glass of the vehicle to sense the rainfall and may include, for example, an emitter IR diode and a receiver IR diode. In this case, the emitter IR diode may emit an infrared ray to the windshield glass. The receiver IR diode may receive the infrared ray totally reflected from the windshield glass or receive a portion of the infrared ray as a reflectance is changed by water on the windshield glass. Eventually, the rain sensor 20 may estimate the rainfall based on an amount of the infrared ray reflected from the windshield glass.

The wiper switch 30 is also referred to as a multi-function switch and may receive setting of the operation mode of the wiper from the driver or may receive setting of the level of the sensitivity (the operation speed or the operation period of the wiper) as a detailed setting when operating in an auto mode. As an example, the operation mode of the wiper may include an OFF mode, the auto mode, a low mode, and a high mode and the sensitivity level may include the lowest level 1 to the highest level 5.

The wiper actuator 40 is a motor (e.g., an H-bridge motor) that drives the wiper 200 and may drive the wiper 200 based on a driving voltage (or a driving current) applied under control of the controller 50.

The controller 50 may perform overall control such that each of the components may normally perform a function thereof. The controller 50 may be implemented in a form of hardware, may be implemented in a form of software, or may be implemented in a form in which the hardware and the software are combined with each other. In an embodiment, the controller 50 may be implemented as a microprocessor, but may not be limited thereto. As an example, the controller 50 may be implemented as a body control module (BCM) or an integrated body unit (IBU).

In particular, the controller 50 may perform various controls in the process of detecting the wiper manipulation pattern of the driver based on the rainfall and controlling the operation mode of the wiper 200 based on the wiper manipulation pattern of the driver.

Hereinafter, the process in which the controller 50 detects the wiper manipulation pattern of the driver based on the rainfall is described.

First, the controller 50 may allocate a score to each of the operation modes of the wiper and the sensitivity levels. This is as shown in [Table 4] and [Table 5] below as an example.

TABLE 4

| Wiper operation mode | | Score |
|---|---|---|
| OFF | | 0 |
| Auto | Auto_Off | 0 |
| | Auto_Int_slow | 0.5 |
| | Auto_Int_fast | 1 |
| | Auto_Low | 2 |
| | Auto_High | 3 |
| | Auto_Power | 3.5 |
| Low | | 2 |
| High | | 3 |

TABLE 5

| Sensitivity level | Score |
|---|---|
| 1 | 0 |
| 2 | 1 |
| 3 | 2 |
| 4 | 3 |
| 5 | 4 |

The controller 50 may determine propensity C of the driver based on a following [Equation 1].

$$C = Wa(a_2 - a_1) + Wb(b_2 - b_1) \quad \text{[Equation 1]}$$

In this case, $a_1$ means a score for a previous wiper operation mode, $a_2$ means a score for a current wiper operation mode, $b_1$ means a score for a previous sensitivity level, and $b_2$ means a score for a current sensitivity level. In addition, Wa (e.g., 1) is a positive weight applied to the [Table 4], Wb (e.g., 0.4) is a positive weight applied to the [Table 5]. In this case, the wiper operation mode more clearly indicates the intention of a user compared to the sensitivity level, so that Wa>Wb is satisfied.

The controller 50 may identify the propensity of the driver based on [Equation 1] above when the operation mode of the wiper is changed or the sensitivity level is changed.

As an example, when the driver changes the sensitivity level to 5 while operating in an Auto_Int_slow mode as it rains in a state set to an auto mode of a sensitivity level 3, because a calculation result of [Equation 1] is positive (C=Wa(0.5−0.5)+Wb(4−2)), the controller 50 may identify that the driver is of the type that desires the operation period or the operation speed of the wiper shorter or higher than that of the reference table.

As another example, when the driver changes the wiper operation mode to an Auto_Low mode while operating in an Auto_Int_fast mode as it rains in the state set to an auto mode of the sensitivity level 5, because a calculation result of [Equation 1] is positive (C=Wa(2−1)+Wb(4−4)), the controller 50 may identify that the driver is of the type that desires the operation period or the operation speed of the wiper shorter or higher than that of the reference table.

As another example, when the driver changes the wiper operation mode to the OFF mode as it rains while operating in the Auto_Int_Slow mode in the state set to an auto mode of the sensitivity level 1, because a calculation result of [Equation 1] is negative (C=Wa(0−0.5)+Wb(0−0)), the controller 50 may identify that the driver is of the type that desires the operation period or the operation speed of the wiper longer or lower than that of the reference table.

The controller 50 may identify the propensity of the driver a reference number of times (e.g., 100 times) and accumulate the identified propensity of the driver to detect the wiper manipulation pattern of the driver. In this case, the controller 50 may change the reference table to [Table 2] when an average value of the values C indicating the identified propensity of the driver is positive and may change the reference table to [Table 3] when the average value is negative.

The controller 50 may control the wiper actuator 40 to operate the wiper 200 based on the reference table as changed (i.e., the driver-customized-table).

In one example, the controller 50 may update the driver-customized-table by periodically performing creation of the driver-customized-table without terminating the creation of the driver-customized-table in one time. In this case, the controller 50 may redundantly use some data used to create an initial driver-customized-table to improve accuracy.

For example, a secondary driver-customized-table may be created using 50 values ($C_{51}$ to $C_{100}$) out of 100 values ($C_1$ to $C_{100}$) representing the propensity of the driver and 50 values ($C_{101}$ to $C_{150}$) identified afterwards. A driver-customized-table with high accuracy may be created by repeatedly performing such process to continuously update the driver-customized-table.

The wiper 200 may be implemented as an electronic control wiper (ECW). In this case, the ECW may be connected to a battery equipped in the vehicle to receive power from the battery, receive a signal from the multi-function switch to control the motor, control a driving direction of the motor in both directions, control a speed of the motor through PWM control, and access a vehicle network through LIN communication. The vehicle network may include a controller area network (CAN), a controller area network with flexible data-rate (CAN FD), a local interconnect network (LIN), a FlexRay, a media oriented systems transport (MOST), an Ethernet, and the like.

Figure 2:
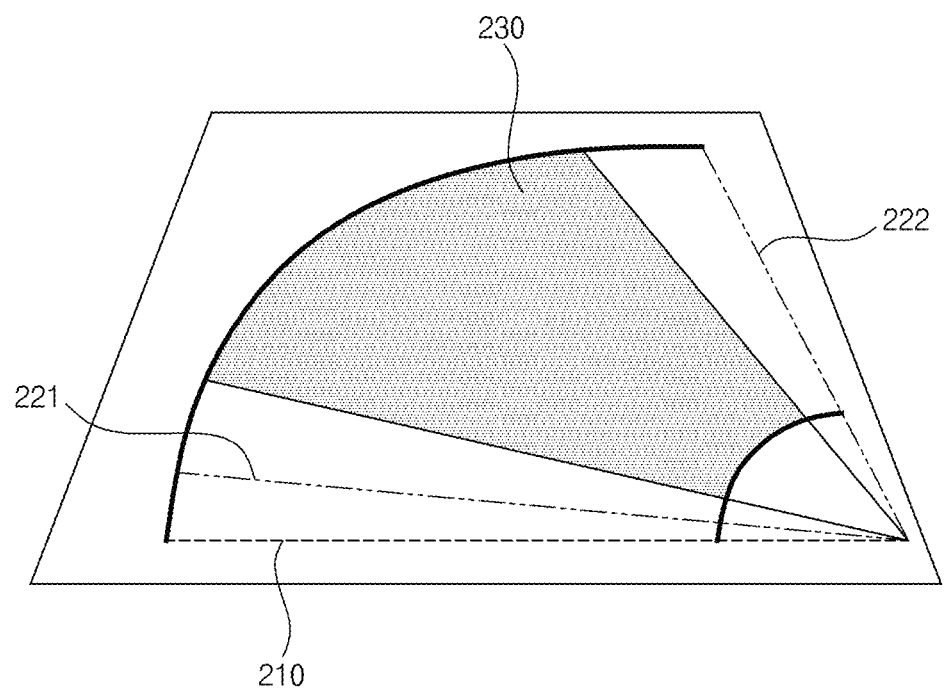
FIG. 2 is a view illustrating a process of operating a wiper in an auto power mode by a controller equipped in a device for controlling a wiper of a vehicle according to an embodiment of the present disclosure.

FIG. 2 is a view illustrating a process of operating a wiper in an auto power mode by a controller equipped in a device for controlling a wiper of a vehicle according to an embodiment of the present disclosure.

In FIG. 2, '210' denotes a parking location of the wiper blade. '221' denotes a location on a left side of the wiper blade in the Auto_Int_slow mode, the Auto_Int_fast mode, the Auto_Low mode, an Auto_High mode, the Low mode, and the High mode. '222' denotes a location on a right side of the wiper blade in the Auto_Int_slow mode, the Auto_Int_fast mode, the Auto_Low mode, the Auto_High mode, the Low mode, and the High mode.

In addition, '230' denotes a wiping region of the wiper blade in an Auto_Power mode. In other words, it may be seen that a wiping angle in the Auto_Power mode is smaller than wiping angles in other modes. Such Auto_Power mode may be applied during the heavy rain.

The controller 50 may control the wiper actuator 40 to operate the wiper in the wiping region like '230' in the Auto_Power mode, thereby providing a faster sense of speed to the driver. In other words, the controller 50 may increase revolutions per minute (RPM) of the motor in the Auto_Power mode.

The controller 50 may detect the wiper manipulation pattern of the driver through machine learning or deep learning.

Figure 3:
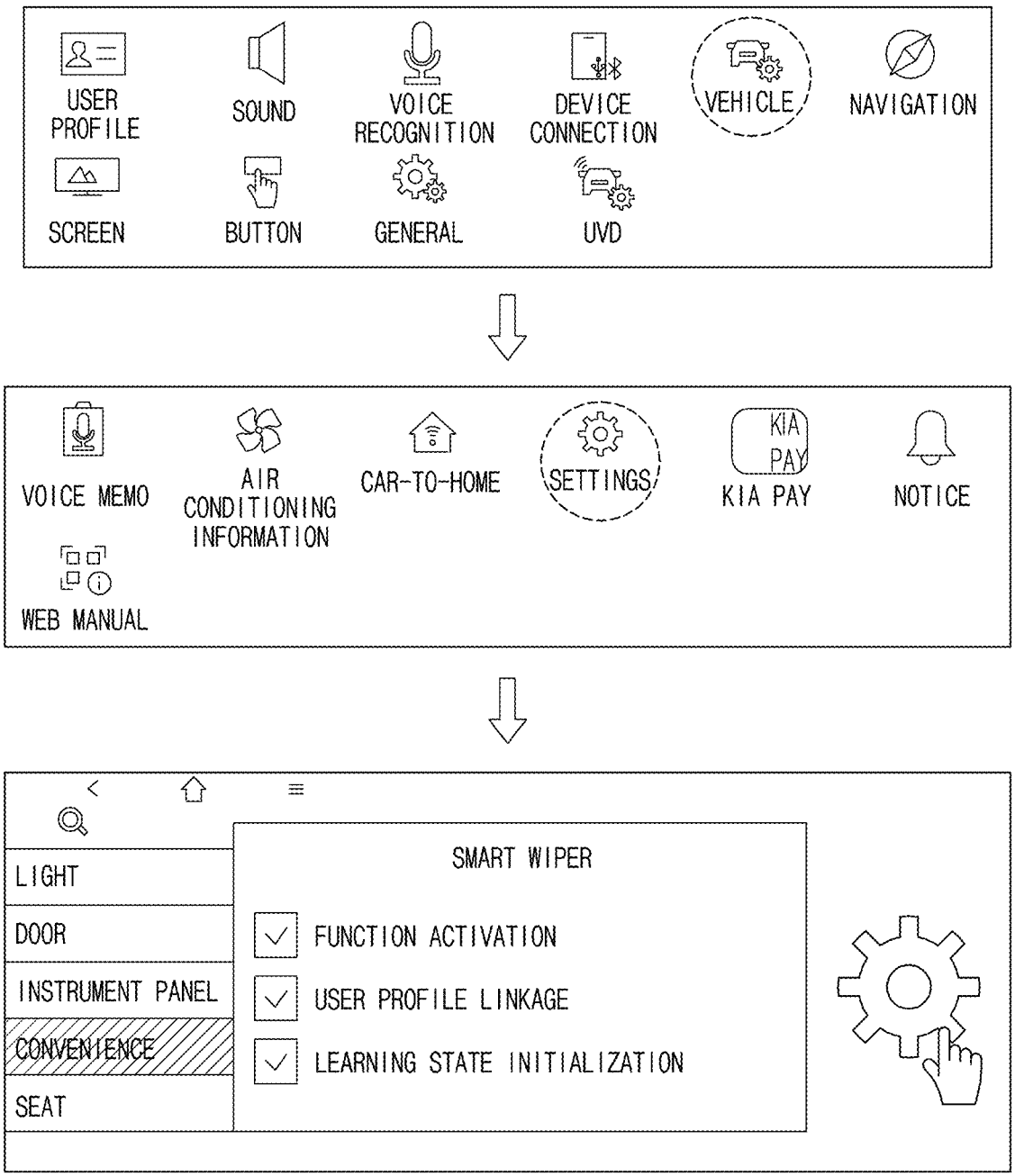
FIG. 3 is a view illustrating a screen in which a controller equipped in a device for controlling a wiper of a vehicle according to an embodiment of the present disclosure provides a personalized service.

FIG. 3 is a view illustrating a screen in which a controller equipped in a device for controlling a wiper of a vehicle according to an embodiment of the present disclosure provides a personalized service.

The controller 50 may create a customized table for each driver even when one vehicle is driven by a plurality of drivers. To this end, a user interface of FIG. 3 may be provided.

The driver may move to 'vehicle'→'Settings'→'Convenience'→'Smart wiper' in a menu to select a function. In this case, the driver may select activation/deactivation of the function of the present disclosure, select a user profile linkage function, and select learning state initialization (for each user). When the driver does not select the function of the present disclosure, the controller 50 may set the sensitivity to a default value (the reference table) set in the vehicle. When the driver selects the user profile linkage function, the controller 50 may create the customized table for each driver. In this case, when the function of the present disclosure is deactivated, the controller 50 may deactivate the user profile linkage function and the learning state initialization function (a driver-customized-table initialization function) so as not to be selected by the driver.

Figure 4:
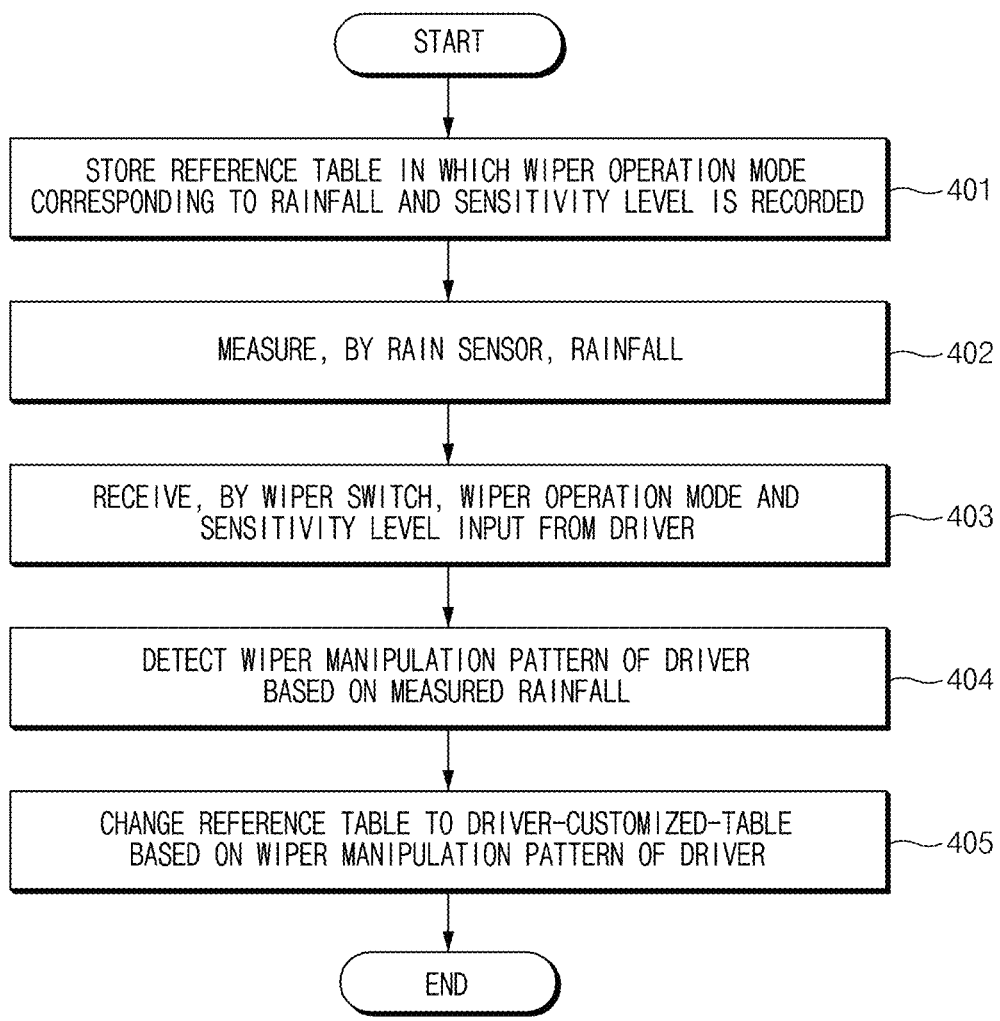
FIG. 4 is a flowchart of a method for controlling a wiper of a vehicle according to an embodiment of the present disclosure.

FIG. 4 is a flowchart of a method for controlling a wiper of a vehicle according to an embodiment of the present disclosure.

First, the storage 10 stores the reference table in which the wiper operation mode corresponding to the rainfall and the sensitivity level is recorded (401).

Thereafter, the rain sensor measures the rainfall (402).

Thereafter, the wiper switch 30 receives the wiper operation mode and the sensitivity level input from the driver (403).

Thereafter, the controller 50 detects the wiper manipulation pattern of the driver based on the measured rainfall (404).

Thereafter, the controller 50 changes the reference table to the driver-customized-table based on the wiper manipulation pattern of the driver (405).

Figure 5:
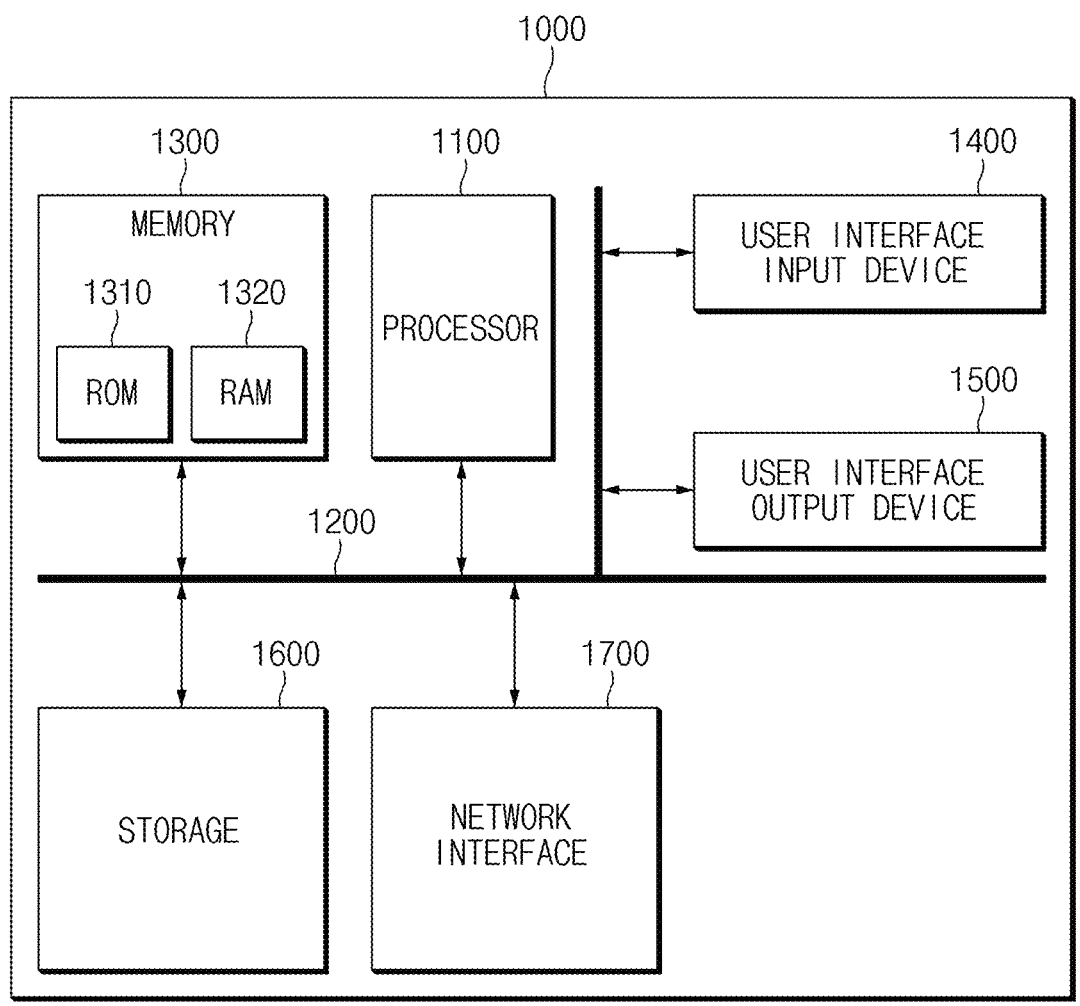
FIG. 5 is a block diagram illustrating a computing system for executing a method for controlling a wiper of a vehicle according to an embodiment of the present disclosure.

FIG. 5 is a block diagram illustrating a computing system for executing a method for controlling a wiper of a vehicle according to an embodiment of the present disclosure.

Referring to FIG. 5, the method for controlling the wiper of the vehicle according to an embodiment of the present disclosure described above may also be implemented using a computing system. A computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100 or in a combination thereof. The software module may reside on a storage medium (i.e., the memory 1300 and/or the storage 1600) such as a RAM, a flash memory, a ROM, an EPROM, an EEPROM, a register, a hard disk, a solid state drive (SSD), a removable disk, and a CD-ROM. The storage medium is coupled to the processor 1100, which may read information from and write information to the storage medium. In another embodiment, the storage medium may be integral with the processor 1100. The processor and the storage medium may reside within an application specific integrated circuit (ASIC). The ASIC may reside within the user terminal. In another embodiment, the processor and the storage medium may reside as individual components in the user terminal.

The description above is merely illustrative of the technical idea of the present disclosure and various modifications and changes may be made by those having ordinary skill in the art without departing from the essential characteristics of the present disclosure.

Therefore, the embodiments described in the present disclosure are not intended to limit the technical idea of the present disclosure but to illustrate the present disclosure. The scope of the technical idea of the present disclosure is not limited by the embodiments. The scope of the present disclosure should be construed as being covered by the scope of the appended claims. All technical ideas falling within the scope of the claims should be construed as being included in the scope of the present disclosure.

The device and the method for controlling the wiper of the vehicle according to an embodiment of the present disclosure as described above may detect the wiper manipulation pattern of the driver based on the rainfall and control the operation mode of the wiper based on the wiper manipulation pattern of the driver. Thus, the device and the method of the present disclosure not only provide the wiper operation mode optimized for the propensity of the driver, but also improve customer satisfaction for the auto mode of the wiper.

Hereinabove, although the present disclosure has been described with reference to specific embodiments and the accompanying drawings, the present disclosure is not limited thereto. The embodiments and drawings may be variously modified and altered by those having ordinary skill in the art to which the present disclosure pertains without departing from the spirit and scope of the present disclosure claimed in the following claims.

What is claimed is:

1. A device for controlling a wiper of a vehicle, the device comprising:
    storage configured to store a reference table, wherein each wiper operation mode corresponding to each rainfall and each sensitivity level is recorded in the reference table;
    a rain sensor configured to measure the rainfall;
    a wiper switch configured to receive a wiper operation mode and a sensitivity level input from a driver; and
    a controller configured to
        detect a wiper manipulation pattern of the driver based on the measured rainfall,
        change the reference table to a driver-customized-table based on the wiper manipulation pattern of the driver, and
        control the wiper of the vehicle based on the reference table,
    wherein detect the wiper manipulation pattern includes:
        identify propensity of the driver when the wiper operation mode is changed or the sensitivity level is changed,
        allocate a score to each of the operation modes of the wiper and the sensitivity levels and to identify propensity C of the driver based on a following [Equation 1]:

$$C = Wa(a_2 - a_1) + Wb(b_2 - b_1)$$ [Equation 1]

wherein $a_1$ means a score for a previous wiper operation mode, $a_2$ means a score for a current wiper operation mode, $b_1$ means a score for a previous sensitivity level, $b_2$ means a score for a current sensitivity level, Wa means a positive weight, and Wb (Wa>Wb) means an applied positive weight.

2. The device of claim 1, wherein the controller is configured to identify the propensity of the driver a reference number of times and to accumulate the identified propensity of the driver to detect the wiper manipulation pattern of the driver.

3. The device of claim 1, wherein the controller is configured to change the reference table to a driver-customized-table having an operation period or an operation speed of the wiper shorter or higher than an operation period or an operation speed of the wiper of the reference table when an average value of the identified propensity C of the driver is positive.

4. The device of claim 3, wherein the controller is configured to update the driver-customized-table using an average value of some of the identified propensity C of the driver and propensity C of the driver identified later.

5. The device of claim 1, wherein the controller is configured to change the reference table to a driver-customized-table having an operation period or an operation speed of the wiper longer or lower than an operation period or an operation speed of the wiper of the reference table when an average value of the identified propensity C of the driver is negative.

6. The device of claim 5, wherein the controller is configured to update the driver-customized-table using an average value of some of the identified propensity C of the driver and propensity C of the driver identified later.

7. The device of claim 1, wherein the wiper operation mode includes an Auto_Int_slow mode, an Auto_Int_fast mode, an Auto_Low mode, an Auto_High mode, an Auto_Power mode, a Low mode, and a High mode.

8. The device of claim 7, wherein the controller is configured to reduce a wiping angle to be smaller than wiping angles in other modes when the wiper is operated in the Auto_Power mode.

9. A method for controlling a wiper of a vehicle, the method comprising:
storing, by storage, a reference table, wherein each wiper operation mode corresponding to each rainfall and each sensitivity level is recorded in the reference table;
measuring, by a rain sensor, the rainfall;
receiving, by a wiper switch, a wiper operation mode and a sensitivity level input from a driver;
detecting, by a controller, a wiper manipulation pattern of the driver based on the measured rainfall;
changing, by the controller, the reference table to a driver-customized-table based on the wiper manipulation pattern of the driver; and
controlling the wiper of the vehicle based on the reference table
wherein the detecting of the wiper manipulation pattern of the driver includes:
identifying propensity of the driver when the wiper operation mode is changed or the sensitivity level is changed;
identifying the propensity of the driver a reference number of times; and
accumulating the identified propensity of the driver to detect the wiper manipulation pattern of the driver,
wherein the identifying of the propensity of the driver includes:
allocating a score to each of the operation modes of the wiper and the sensitivity levels; and
identifying propensity C of the driver based on a following [Equation 1]:

$$C = Wa(a_2 - a_1) + Wb(b_2 - b_1)$$ [Equation 1]

wherein $a_1$ means a score for a previous wiper operation mode, $a_2$ means a score for a current wiper operation mode, $b_1$ means a score for a previous sensitivity level, $b_2$ means a score for a current sensitivity level, Wa means a positive weight, and Wb (Wa>Wb) means an applied positive weight.

10. The method of claim 9, wherein the changing of the reference table to the driver-customized-table includes:
changing the reference table to a driver-customized-table having an operation period or an operation speed of the wiper shorter or higher than an operation period or an operation speed of the wiper of the reference table when an average value of the identified propensity C of the driver is positive; and
changing the reference table to a driver-customized-table having an operation period or an operation speed of the wiper longer or lower than the operation period or the operation speed of the wiper of the reference table when the average value of the identified propensity C of the driver is negative.

11. The method of claim 10, further comprising:
updating the driver-customized-table using an average value of some of the identified propensity C of the driver and propensity C of the driver identified later.

12. The method of claim 9, wherein the wiper operation mode includes an Auto_Int_slow mode, an Auto_Int_fast mode, an Auto_Low mode, an Auto_High mode, an Auto_Power mode, a Low mode, and a High mode.

13. The method of claim 12, further comprising:
reducing a wiping angle to be smaller than wiping angles in other modes when the wiper is operated in the Auto_Power mode.

14. A device for controlling a wiper of a vehicle, the device comprising:
the wiper disposed on the vehicle;
a rain sensor configured to measure a rainfall;
a wiper switch configured to receive an operation mode of the wiper and a sensitivity level of the rain sensor; and
a controller configured to
detect a wiper manipulation pattern of a driver based on the measured rainfall,
control the operation mode of the wiper based on the wiper manipulation pattern of the driver,
wherein detect the wiper manipulation pattern includes:
allocate a score to each operation mode of the wiper and each sensitivity level, and
identify propensity C of the driver based on a following [Equation 1] when the operation mode of the wiper is changed or the sensitivity level is changed:

$$C = Wa(a_2 - a_1) + Wb(b_2 - b_1)$$ [Equation 1]

wherein $a_1$ means a score for a previous wiper operation mode, $a_2$ means a score for a current wiper operation mode, $b_1$ means a score for a previous sensitivity level, $b_2$ means a score for a current sensitivity level, Wa means a positive weight, and Wb (Wa>Wb) means an applied positive weight.

15. The device of claim 14, wherein the controller is configured to:
change the reference table to a driver-customized-table having an operation period or an operation speed of the wiper shorter or higher than an operation period or an operation speed of the wiper of the reference table when an average value of the identified propensity C of the driver is positive; and
change the reference table to a driver-customized-table having an operation period or an operation speed of the wiper longer or lower than the operation period or the operation speed of the wiper of the reference table when the average value of the identified propensity C of the driver is negative.

* * * * *